(12) United States Patent
Raley et al.

(10) Patent No.: US 12,182,223 B1
(45) Date of Patent: Dec. 31, 2024

(54) SYSTEMS AND METHODS FOR ONLINE IDENTITY MANAGEMENT

(71) Applicant: United Services Automobile Association (USAA), San Antonio, TX (US)

(72) Inventors: Christopher Raley, San Antonio, TX (US); Ryan Russell, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 18/369,596

(22) Filed: Sep. 18, 2023

Related U.S. Application Data

(63) Continuation of application No. 17/222,306, filed on Apr. 5, 2021, now Pat. No. 11,762,942, which is a continuation of application No. 16/855,845, filed on Apr. 22, 2020, now Pat. No. 10,977,335, which is a continuation of application No. 15/892,271, filed on Feb. 8, 2018, now Pat. No. 10,671,693.

(60) Provisional application No. 62/457,546, filed on Feb. 10, 2017.

(51) Int. Cl.
| | | |
|---|---|---|
| G06F 15/173 | (2006.01) | |
| G06F 16/9535 | (2019.01) | |
| G06F 16/958 | (2019.01) | |
| H04L 9/40 | (2022.01) | |
| H04L 67/306 | (2022.01) | |
| G06F 3/0484 | (2022.01) | |

(52) U.S. Cl.
CPC ........ *G06F 16/958* (2019.01); *G06F 16/9535* (2019.01); *H04L 63/083* (2013.01); *H04L 63/102* (2013.01); *H04L 67/306* (2013.01); *G06F 3/0484* (2013.01)

(58) Field of Classification Search
CPC .. G06F 16/958; G06F 16/9535; G06F 3/0484; H04L 63/102; H04L 63/083; H04L 67/306
See application file for complete search history.

(56) References Cited

U.S. PATENT DOCUMENTS

| | | |
|---|---|---|
| 8,752,832 B2 | 6/2014 | Mitamura |
| 8,984,151 B1 | 3/2015 | Hsieh et al. |
| 9,843,576 B1 | 12/2017 | Peng |
| 10,122,706 B2 * | 11/2018 | Greenspan .............. G06F 21/45 |
| 10,949,830 B1 | 3/2021 | Gaudin et al. |
| 2005/0010635 A1 | 1/2005 | Schwesig et al. |

(Continued)

*Primary Examiner* — John B Walsh
(74) *Attorney, Agent, or Firm* — Fletcher Yoder, P.C.

(57) ABSTRACT

Disclosed systems and methods allow a user to input digital content along with identification of one or more social media websites on which the user desires to publish the digital content. The systems and methods then query the identified social media webservers and retrieve a first set of publishing rules. When the digital content satisfies the first set of rules, the systems and methods query a database to retrieve a second set of rules comprising user restrictions specific to the identified social media websites. When the digital content does not satisfy at least one rule within the second set of rules, the systems and methods render a prompt on the user device to receive modified digital content. Subsequently, the systems and methods instruct the one or more social media websites to publish the modified digital content.

20 Claims, 8 Drawing Sheets

(56) References Cited

U.S. PATENT DOCUMENTS

| | | |
|---|---|---|
| 2007/0157237 A1 | 7/2007 | Cordray et al. |
| 2009/0044131 A1 | 2/2009 | Pylappan et al. |
| 2009/0292762 A1 | 11/2009 | Mettala et al. |
| 2014/0344179 A1 | 11/2014 | Glanville et al. |
| 2016/0055327 A1* | 2/2016 | Moran .................... G06F 21/32 726/19 |
| 2016/0125522 A1* | 5/2016 | Tang ...................... G06Q 40/00 705/35 |
| 2021/0224799 A1* | 7/2021 | Ongpin ................ H04L 63/083 |

* cited by examiner

SYSTEMS AND METHODS FOR ONLINE IDENTITY MANAGEMENT

CROSS REFERENCE TO RELATED APPLICATIONS

This application is a continuation of U.S. patent application Ser. No. 17/222,306, entitled "Systems and Methods for Online Identity Management," filed on Apr. 5, 2021, which is a continuation of U.S. patent application Ser. No. 16/855,845, entitled "Systems and Methods for Online Identity Management," filed on Apr. 22, 2020, which is a continuation of U.S. patent application Ser. No. 15/892,271, filed on Feb. 8, 2018, which claims priority to U.S. Provisional Patent Application Ser. No. 62/457,546, filed on Feb. 10, 2017, each of which is incorporated herein by reference in its entirety for all purposes.

TECHNICAL FIELD

This application relates generally to systems and methods for an integrated network credentials management system.

BACKGROUND

Currently, a user has to create respective user profiles for the plethora of internet based service providers and/or content providers. For instance, the user has to create a username and an associated password while buying goods or services online. For social media sites, the user has to create a social media handle that publicly identifies the user. The social media handle has to be associated with a password to prevent unauthorized usage of the social media handle. For other content providers, such as online banking, news sites, or blogs, the user has to sign up by providing a username and creating an associated password. Some internet-based providers require the user to select a picture or a symbol to identify the user.

From the user's perspective, the process of creating these usernames and the associated passwords is a cumbersome process. For each and every internet based provider the user accesses via the internet, the user may have to create a username and password. For convenience, the user may try to use the same username and password for multiple internet based providers. However, this approach has a few problems. The same username may not be available across various internet-based providers. For example, a different user with a similar name may have already taken the username from a particular internet based provider. Furthermore, having a same username and password combination has a security risk—if a malicious entity accessed the username and password, the malicious entity may use the username and password across various internet based providers for unauthorized transactions.

Furthermore, many users may have multiple active accounts with one or more social media websites and frequently electronically publish digital content to more than one social media website. However, different social media websites may have different electronic publishing requirements and many users may have different electronic publishing requirements for different social media websites. For example, digital content that is suitable for one social media website may not be suitable for a second social media network. As a result, in order to electronically publish digital content to more than one social media websites, users are required to upload the digital content to each social media website separately, which has created a negative user experience and is undesirable.

SUMMARY

For the aforementioned reasons, what is therefore desired is an integrated system that allows a user to create account identifying information, such a username or a social media handle, that can be used across multiple web services. What is also desired is an integrated system that manages the account security information, such as a password or a passcode, associated with the account identifying information. The systems and methods disclosed herein are intended to address the shortcomings in the art mentioned above, and provide additional or alternative benefits as well. More specifically, the systems and methods described herein enable a user to claim ownership of a set of online credentials, such as a username or a social media handle, and allow the user to validate himself or herself across various web services through the set of online credentials. For example, a system may receive from a user a username or a social media handle of which the user wants to claim an ownership. The system may verify with various external web services that an account exists for the username. If an account does not exist, the computer system may prompt and aid the user to create an account with external web services with which the user does not have an account. The system may link the username with the multiple accounts across various external web services such that the user can login to these services with a single login to the system. Furthermore, the system may gather information about user from the various external web services to generate a user profile supplemented by inputs from the user. The system may use this user profile to update the user profiles/user accounts at the various external web services. The system may also manage all online publishing requested by the user and ensure that they satisfy a set of rules implemented by different social media websites and/or created by the user for each particular social media website.

In an embodiment, a computer implemented method comprises receiving, by a server from a user device, a first instruction to electronically publish digital content, the first instruction comprising identification of a plurality of social media webservers and the digital content; querying, by the server, a plurality of databases of the plurality of social media webservers to retrieve one or more data records indicating an electronic publishing requirement for each social media webserver, the electronic publishing requirement comprising a first set of rules corresponding to digital content restricted by at least one of the social media webservers; determining, by the server, whether the digital content satisfies the electronic publishing requirement; in response to the digital content satisfying the electronic publishing requirement, querying, by the server, a second database to retrieve a user profile, the user profile comprising a second set of rules corresponding to digital content restricted, by a user operating the user device, from being electronically published; when the digital content satisfies the second set of rules displaying, by the server, a prompt on the user device comprising a notification that the digital content satisfies the second set of rules; and transmitting, by the server, a second instruction to the plurality of social media webservers, the second instruction comprising the digital content and configured to instruct each social media webserver to electronically publish the digital content; when the digital content does not satisfy the second set of rules displaying, by the server, one or more content modification messages on the user device comprising at least one second rule not satisfied; receiving, by the server, modified digital content; and transmitting, by the server, a third instruction to the plurality of social media webservers, the third instruction comprising the modified digital content and configured to instruct each social media webservers to electronically publish the modified digital content.

In another embodiment, a computer system comprises a plurality of social media webservers in communication with and configured to execute a plurality of social media websites; a user device operated by a user; a server in communication with the plurality of social media webservers and the user device, the server configured to receive from the user device, a first instruction to electronically publish digital content, the first instruction comprising identification of a plurality of social media webservers and the digital content; query a plurality of databases of the plurality of social media webservers to retrieve one or more data records indicating an electronic publishing requirement for each social media webserver, the electronic publishing requirement comprising a first set of rules corresponding to digital content restricted by at least one of the social media webservers; determine whether the digital content satisfies the electronic publishing requirement; in response to the digital content satisfying the electronic publishing requirement, query a second database to retrieve a user profile, the user profile comprising a second set of rules corresponding to digital content restricted, by a user operating the user device, from being electronically published; when the digital content satisfies the second set of rules display a prompt on the user device comprising a notification that the digital content satisfies the second set of rules; and transmit a second instruction to the plurality of social media webservers, the second instruction comprising the digital content and configured to instruct each social media webserver to electronically publish the digital content; when the digital content does not satisfy the second set of rules display one or more content modification messages on the user device comprising at least one second rule not satisfied; receive modified digital content; and transmit a third instruction to the plurality of social media webservers, the third instruction comprising the modified digital content and configured to instruct each social media webservers to electronically publish the modified digital content.

BRIEF DESCRIPTION OF THE DRAWINGS

The accompanying drawings constitute a part of this specification and illustrate embodiments of the subject matter disclosed herein.

DETAILED DESCRIPTION

Figure 1:
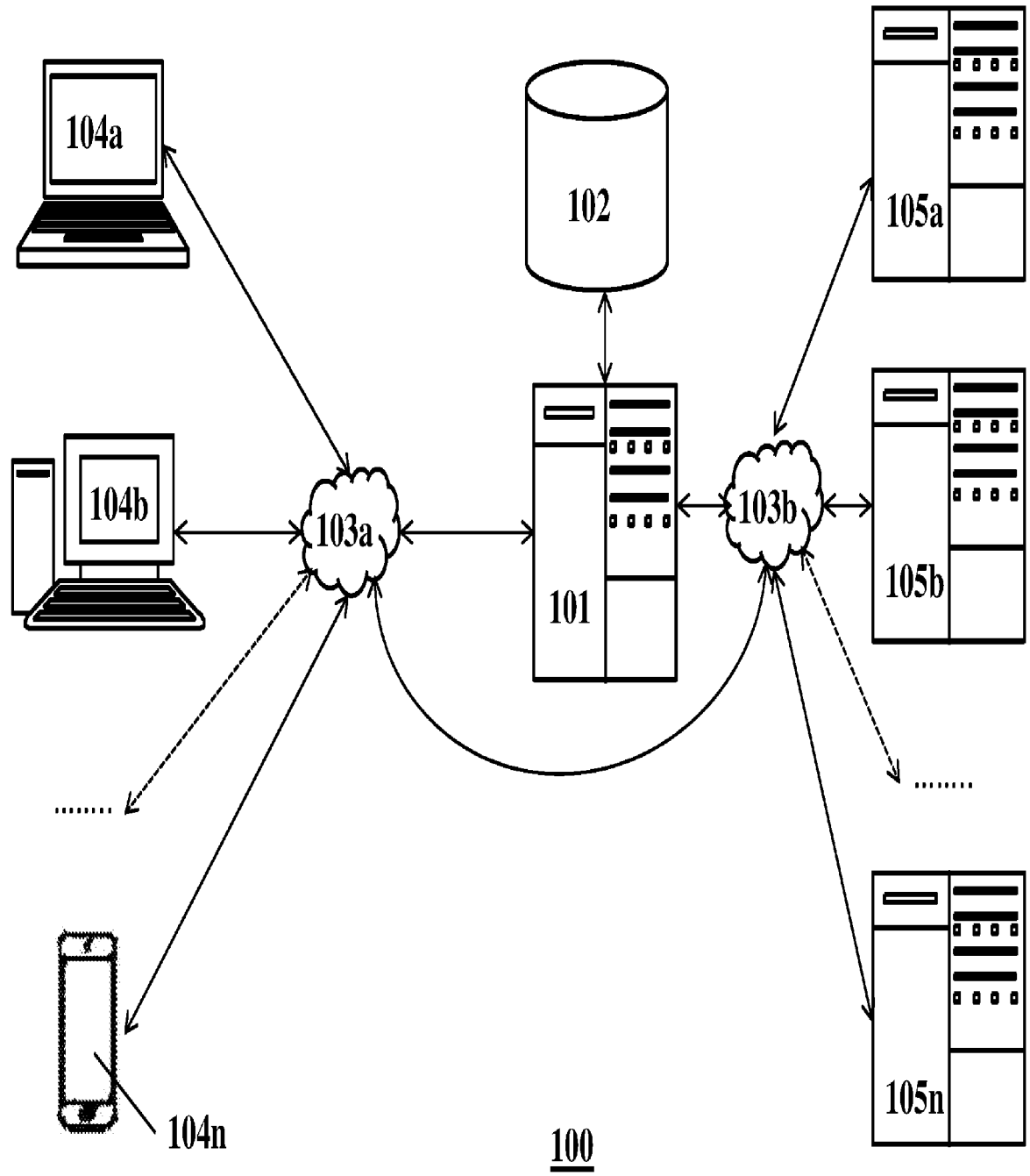
FIG. 1 shows an exemplary system for managing online identity, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Embodiments disclosed herein describe systems and methods that enable a user to claim ownership of a set of online credentials such as a username or a social media handle and allow the user to validate himself or herself across various web services through the set of online credentials. For example, a system may receive from a user a username or a social media handle of which the user wants to claim an ownership. The system may verify with various external web services that an account exists for the username. If an account does not exist, the computer system may prompt and aid the user to create an account with external web services with which the user does not have an account. The system may link the username with the multiple accounts across various external web services such that the user can login to these services with a single login to the system. Furthermore, the system may gather information about user from the various external web services to generate a user profile supplemented by inputs from the user. The system may use this user profile to update the user profiles/user accounts at the various external web services.

The systems and methods described herein also authenticate users for various external web services. For example, a user may be attempting to log into a website. A system may receive a request from the website to authenticate the user. In response, the system may authenticate the user based on the user's usage pattern stored in a user profile. The system may further prompt the user to answer additional authentications questions, if necessary. In some implementations, the system may receive a login request to access the website. In these implementations, the system may authenticate the user and initiate a token session with the website. Additionally or alternatively, the system may implement a session authentication between a browser in a device associated with the user and the website.

The systems and methods may also automatically create accounts for the user using the user's preferred online credentials such as a username. For example, a system may determine that a new social media entity has just launched. The system may determine, based upon the user's usage patterns and preferences in the user profile that the user may want to create an account with the new social media entity and automatically create an account with the new social media entity with the user's preferred username.

The systems and methods may manage the content (e.g., social media content) for a user. For example, a user may want to post to a social media website. A system may receive the post and determine that the post has to be modified to be compliant with the posting requirements of the website. The system may further determine recommended modifications and propose the same to the user.

FIG. 1 shows an exemplary system 100 for managing online identity according to an exemplary embodiment. The system 100 may comprise a system server 101, a database 102, networks 103, user devices 104, and external servers 105.

The system server 101 may comprise various hardware and software components that may receive data from and transmit data to user devices 104 through a network 103a. The hardware and software components may further receive data from and transmit data to external servers 105 through a network 103b. The system server 101 may store the received data in the database 102 and, in some configurations, retrieve data stored in the database 102. The system server 101 may also perform various operations on the data retrieved from the database 102 and on data received from user devices 104 and the external servers 105. The system server 101 may be any computing device comprising non-transitory machine-readable storage media and a processor capable of executing the various processes and tasks described herein. Non-limiting examples of the system server 101 may include a server computer, a desktop, a laptop, a tablet, or the like. In some cases, the system server 101 may be coupled to the database 102 of the system 100, and, in other cases, the system server 101 may host the database 102.

In some embodiments, the system server 101 may host an application server or webserver, either of which may include software modules allowing the user devices 104 to access and manipulate data in the database 102 or in the server 101. For example, the system server 101 may comprise a webserver allowing the user devices 104 to access data that is collected and manipulated by the system server 101. In this example, a subscriber to the system 100, who may be operating a first user device 104a, may point a web browser application executed by the first user device 105a to a website hosted on the webserver in order to access the data stored in the database 102 and results generated by the system server 101. For example, a user may access one or more account identifying information and account security information. The subscriber may instruct the system server 101 to access various forms of data records produced and stored by the system server 101, using the data retrieved from the database 102. In another example in which the database 102 comprises a web-accessible application server, a user device 104 include be a mobile device (e.g., tablet, laptop, smart phone) executing a software application configured to access the system 100. In this example, a subscriber to the system 100 may use the mobile application to instruct the system server 101 to access various forms of data in the stored in the database 102. In yet another example, the server 101 may employ one or more application programming interfaces (API) executing on any of the user devices 104 in order to monitor the user's actions (e.g., interactions, such as inputting various data, user names, passwords, and the like) and to receive the data directly from the user's devices.

The database 102 may be any type of database storing user profiles and profiles of external web services. The user profiles may include information of user accounts with the external web services. For example, user profile for a user may include the user's username and password for logging into an external web service. Furthermore, the user profile may include additional information about the user such as the user's address, date of birth, marital status. The system server 101 may use the additional information about the user to authenticate the user. Furthermore, the system server 101 may use the additional information to create a user profile of the user with one or more external web services. The database 102 may further store profiles of external web services. The profiles of external web services may include, for example, the application programming interface (API) of external web services, or the internet protocol (IP) addresses of the external web servers 105 hosting the external web services. Furthermore, the profiles of the external web services may include a list of the pieces of information required by the external web services to generate complete or substantially complete user profiles with the external web services.

The networks 103 may by any type of network providing communications links to the components of the system 100. Non-limiting examples of the networks 103 include the internet, local area network (LAN), metropolitan area network (MAN), and wide area network (WAN). The networks 103 may include both wired and wireless communication links. A person ordinarily skilled in the art appreciates that the networks 103 may include components such as routers, repeaters, satellite links, and transmission lines.

The user devices 104 may be any type devices that a user may use to access the server and/or the external servers 105. Non-limiting examples of user devices 104 include desktop computers, laptop computers, tablet computers, smartphones, and server computers. A user may use user devices 104 to provide an account identifying information such as a username or social media handle to the system server 101. Furthermore, the user may use the user devices 104 to provide account security information such as a password or a passcode to the system server 101. Furthermore, the user may use the user devices to provide authentication information requested by the system server 101.

The external web servers 105 may host web services such as a social media website, a news site, a blog site, a vlog site, or an online merchant. The external web servers 105 may receive login requests from the user devices 104 and transmit corresponding notifications to the system server 101. The system server 101 may validate the login request or may request additional authentication information. The external web servers 105 may also receive requests for creating new accounts from the user devices 104 and transmit the corresponding notifications to the system server 101. In some implementations, the system server 101 may receive account login requests, authenticate the account login requests, and transmit the authenticated requests to the external web servers 105. Furthermore, the system server 101 may receive requests for creating new accounts, authenticate the received requests for creating new accounts, and transmit the authenticated requests to the external web servers.

In operation, the system server 101 may receive a login request, from a user device 104, to a web service hosted by one or more web servers 105. The system server 101 may authenticate the user by the user provided credentials such as a username and password. In some embodiments, the system server may require additional authentication information. Once system server 101 authenticates the user, the system server may send a token to the one or more web servers 105 such that the user can establish a connection with the web service hosted by the one or more web servers 105. In some implementations, system server 101 may send a set of tokens to servers hosting a set of web services such that a user may establish a connection with the set of web services based upon a single authentication by the system server 101.

Figure 2:
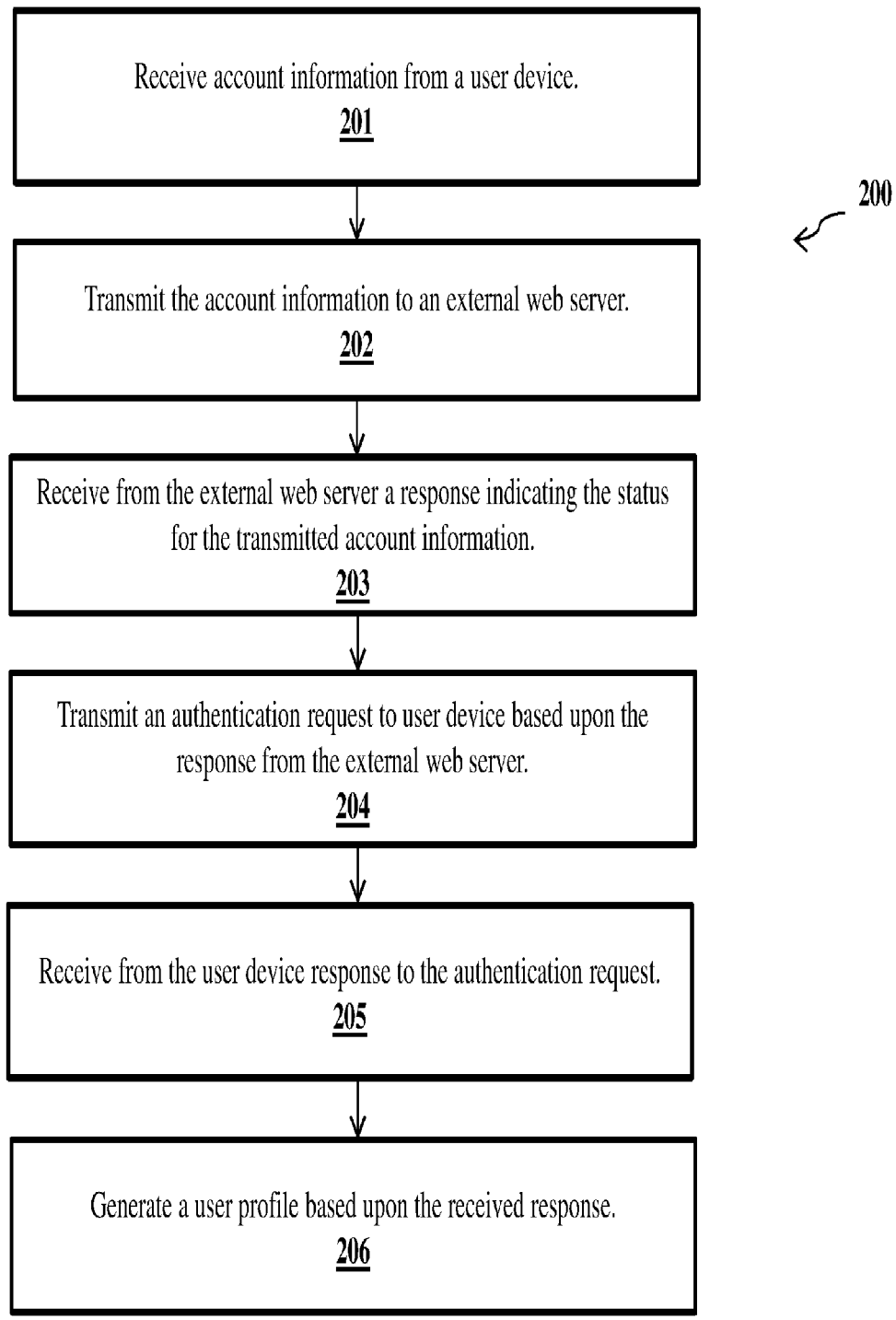
FIG. 2 shows an exemplary method of validating a user account with an external web service, according to an exemplary embodiment

FIG. 2 shows an exemplary method 200 of validating a user account with an external web service, according to an exemplary embodiment. Although one or more computer systems and one or more databases may implement one or more steps of the method 200, the following description details, for brevity, a computer system and a database implementing the method 200.

In a first step 201, the computer system may receive account information from a user device. For instance, the computer system may receive from the user device one or more messages containing account information associated with a user. The account information may include account identifying information such as a username, an e-mail address, or a social media handle. As another example, the account identifying information may include a picture or a photograph associated with the user. In addition, the account information may include account security information such as a password, a passcode, a passphrase, biometric data, or a pin corresponding to a username, an e-mail address, or a social media handle.

In a next step 202, the computer system may transmit the account information to an external web server. The external web server may host the external web service. The external web service may include, for instance, a social media website, a bank website, or a merchant website. In some implementations, the computer system may use the application programming interface (API) of a web-application running in the external web server to transmit the account information. In other implementations, the computer system may initiate a browser session with the external web server, access a website hosted by the external web server, and transmit the account information to the website. In some embodiments, the computer system may transmit the account identifying information to the external web server without the account security information. By doing so, the computer system may verify the existence of a user account identified by the account identifying information without logging into the user account identified.

In a next step 203, the computer system may receive from the external web server a response indicating the status for the transmitted account information. The response may include an indication that the account information was valid for the external web service hosted by the external web server. As an alternative, the response may include an indication that the account information was invalid for the external web service hosted by the external web server. As another alternative, the response may include an indication that the account information was partially valid for the external web service hosted by the external web server. For example, the response may indicate that a username was valid but the password provided did not match the username. In the embodiments where the computer system transmitted the identifying information without the security information, the response may include an indication that a user account identified by the account identifying information exists for the external web service hosted by the external web server. In the alternative, the response may include an indication that a user profile does not exist for the provided identifying information.

In a next step 204, the computer system may transmit an authentication request to the user device based upon the response received from the external web server. In some instances, the response from the external web server may include indication that additional information of the user is required by the external web service hosted by the external web server. The additional information may include, for a user having a preexisting account with the external web service, additional authentication information required to log into the preexisting account. For example, the additional authentication information may include date of birth, social security number, or home address. In some instances, the account credentials provided by the user and transmitted to the external web server may be partially correct, for example, a login username may be correct but the password may be incorrect. In these instances, the external web service hosted by the external web server may require additional authentication information such as the user's date of birth, or answers to password retrieval questions to reset the user's password. In the embodiments where the response from the external server indicates that a user account does not exist for the account identifying information, the authentication request may include a prompt for the user if the user wants an account for the external web service hosted by the external web server. In these embodiments, the authentication request may include one or more prompts for the user to provide necessary information for creating a user account for the web service hosted by the external server.

In some embodiments, the computer system may display a prompt that inquires user's extra information. For example, the computer system may receive an indication, from the external web server, that additional authentication information may be needed; the computer system may then display a prompt with one or more graphical input elements (e.g., radio buttons, drop down menus, input field configured to receive input text strings, and the like) in order to receive the user's input. In some other configurations, the computer system may have access to one or more databases or pre-stored web-based interfaces, such as webpages or other GUI component, comprising a number of preconfigured sub-interfaces, such as various containers, and dynamically populate/render the above-mentioned prompt on the user's device. For example, webpages may contain code, such as HTML or PHP, presenting a website of any number of webpages having a common "look-and-feel." In those configurations, the computer system may render the prompt while preserving the look and feel of the external web server's graphical user interface.

In a next step 205, the computer system may receive from the user computer user response to the authentication request. In a next step 206, the computer system may generate user profile based upon the received responses. The user profile may include, for example, one or more usernames, one or more social media handles, and one or more passwords or passcodes. The user profile may further include additional information about the user received in the response to the authentication request. The user profile may also include data records linking the user information such as a username to one or more external web services hosted by one or more external web servers. The computer system may use the information on the generated user profile to access one or more web services. The computer system may store the user profile in the database. The computer system may also store in the database that the user wants to capture the ownership of the account identifying information such as a username or a social media handle. The computer system may use the same username or social media handle when attempting to create a user account with new external web services.

Figure 3:
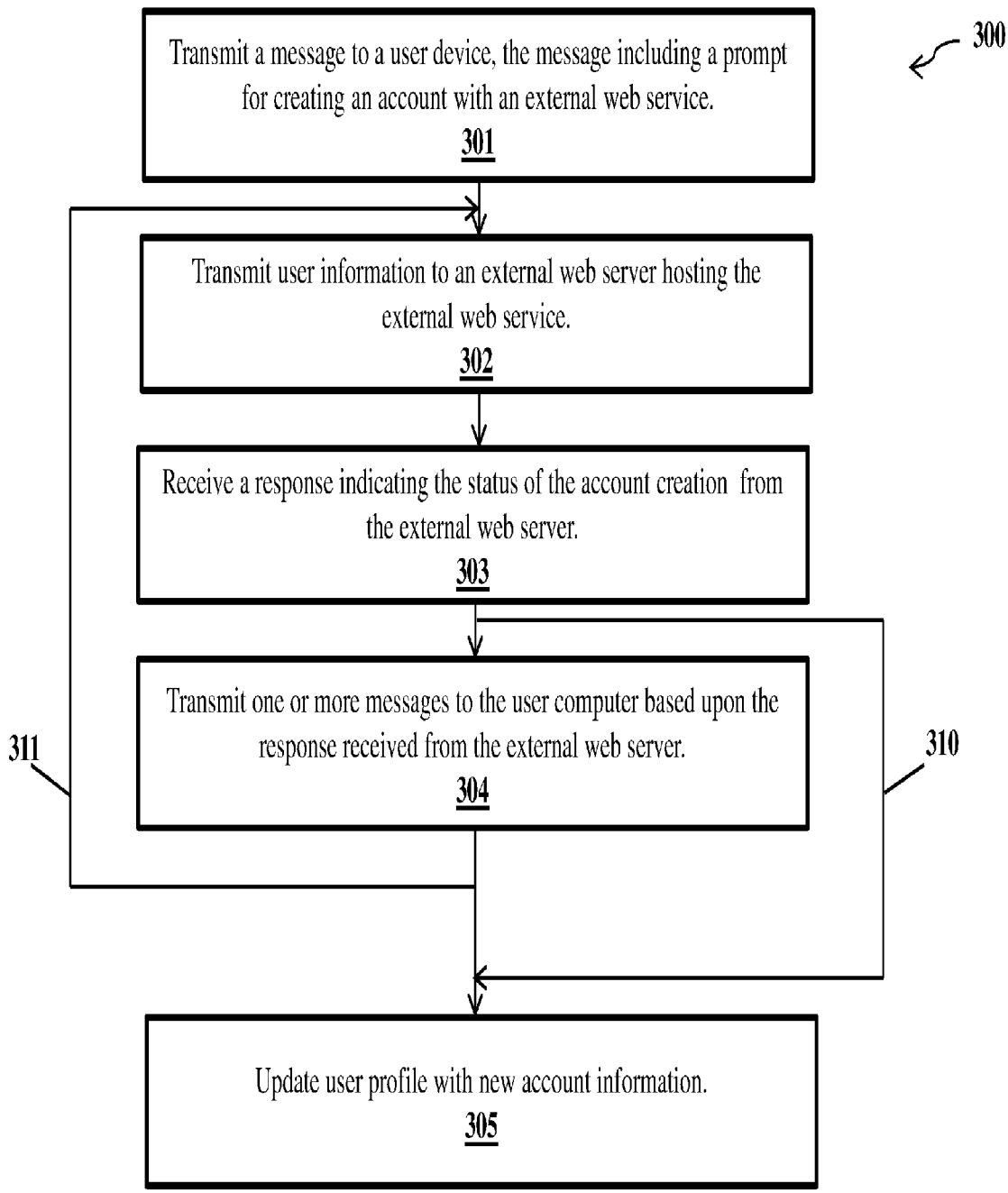
FIG. 3 shows an exemplary method of creating a user account with an external web service, according to an exemplary embodiment.

FIG. 3 shows an exemplary method 300 of creating a user account with an external web service, according to an exemplary embodiment. Although one or more computer systems and one more databases may implement one or more steps of the method 300, the following description details, for brevity, a computer system implementing the method 300.

In a first step 301, the computer system may transmit a message to a user device, the message including a prompt for creating an account with an external web service. The computer system may generate the message based on a user profile and external web service profiles, both stored in the database. The user profile may include account identification information such as a username, a social media handle, and/or any other type of account identification information. The user profile may further include account security information such as a password, a passcode, a pin code, and/or any other type of account security information. The user profile may also include data records indicating whether the user has an account with one or more external web services. The user profile may also include data records indicating the preferences of the user. For example, the user profile may include an indication that the user is interested in creating account with social media entities as opposed to online merchants.

In some embodiments, the computer server may monitor the user's activities and may automatically send the above-mentioned message upon determining that the user is interested in creating an account with an external web service (e.g., when the user interact with a hyperlink on a website configured to create an account). For example, an application associated with the computer system (or any other software module executing on the user device) may be executing in the background of the user device (e.g., without being displayed on the display screen). When the application detect that the user is interested in creating an account, the application send a notification to the computer server; and the computer system may cause the application to display the prompt.

Based upon the user profile and the external web service profiles, the computer system may generate the message to be transmitted to the user computer. For example, the computer system may determine that the user does not have an account with a social media entity and that the user has indicated (in the user profile) that he or she is generally interested in signing up with social media entities. The computer system may generate and transmit a message prompting the user whether or not the user wishes to generate an account with a social media entity.

In a next step 302, the computer system may transmit the user information to the external web server hosting the external web service. The computer system may transmit the user information to the external web server based upon receiving a message from the user device that the user wishes to create an account with the external web service. In some implementations, the computer system may retrieve the user information from the stored user profile. In other implementations, the computer system may transmit request messages to the user computer requesting other information required for creating an account with the external web service.

In a next step 303, the computer system may receive a response indicating the status of account creation from the external web server. The response may include an indication that an account has been created and further include confirmation information, for example, a confirmation number. If the response includes an indication that an account has been created, the computer system may follow the flow 310 to step 305 to update the user profile with new account information. The new account information may include, for example, the username and password of the newly created account and one or more security questions and the corresponding responses. In some instances, the response may include an indication that an account could not be created and that further information is required to create the account. In these instances, the computer system may execute a next step 304.

In the next step 304, the computer system may transmit one or more messages to the user device based upon the response received from the external web server. The one or more messages may include a confirmation that a user account was created in the external web service hosted in the external server. The computer system may further transmit to the user device the new account details stored in the user profile. Alternatively, the one or more messages may include an indication that an account could not be created and further user information is required to create the account. The one or more messages may include prompts for the user to enter the further user information. For example, the external service may require the user's date of birth to generate a user account in the external server, and the computer system may transmit a prompt to the user for the user to enter his/her date of birth. The computer system may follow the flow 311 to step 302 and transmit the information received from the user computer to the external web service. In some implementations, the computer system may execute the steps 302, 303, 304 until an account has been created with the external web service. In other implementations, the user may instruct the computer system to stop executing the steps 302, 303, 304 and other steps of the method 300 after a predetermined number of iterations of the steps 302, 303, 304.

In a next step 305, the computer system may update the user profile with new account information. The new account information may include, for example, the username and password of the newly created account and one or more security questions and the corresponding responses.

Figure 4:
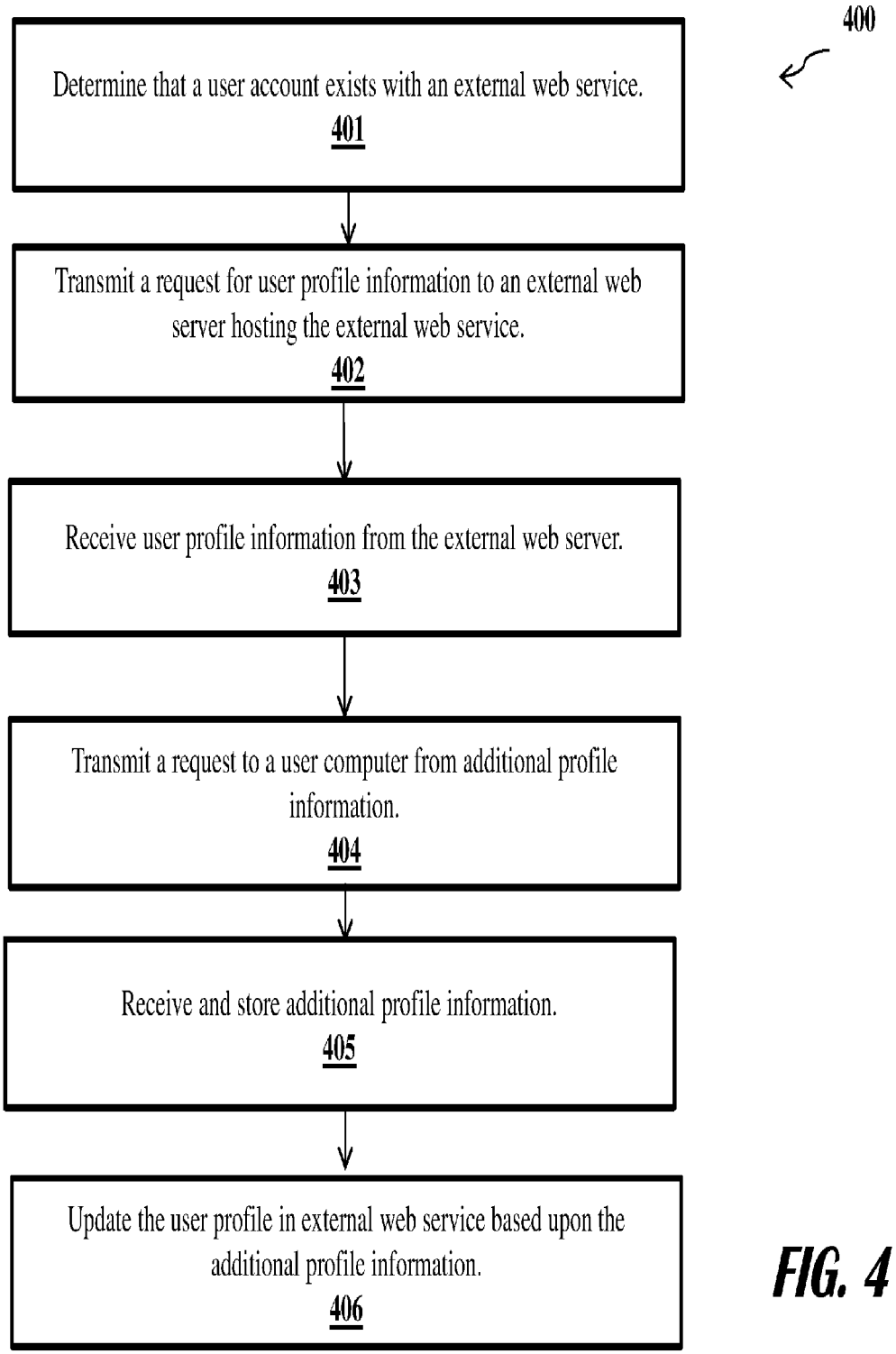
FIG. 4 shows an exemplary method of creating a user profile with an external web service, according to an exemplary embodiment.

FIG. 4 shows an exemplary method 400 of creating a user profile with an external web service, according to an exemplary embodiment. Although one or more computer systems and one or more databases may implement one or more steps of the method 400, the following description details, for brevity, a computer system and a database associated with the computer system implementing the method 400.

In a first step 401, the computer system may determine that a user account exists with an external web service. In some instances, the computer system may determine that the user account exists based on an indication received from a user device (e.g., the user has indicated an existence of a user account in his/her profile). Alternatively or in addition, the computer system may determine that the user account exists based upon the user profile and/or external web service profiles stored in the database (e.g., sending a query instruction to the external web service server to determine whether the user has a user account). In some instances, the computer system may create a user account with the external web service before executing the first step 401.

In a next step 402, the computer system may transmit a request for user profile information to an external web server hosting the external web service. In some implementations, the computer system may use the application programming interface (API) of a web-application running in the external web server to transmit the request. In other implementations, the computer system may initiate a browser session with the external web server, access a website hosted by the external web server, and transmit the request to the website. In some embodiments, the computer system may also transmit an authorization token along with the request. The authorization token may be generated and recognized by the external web server. For example, the external web server (in order to preserve account security) may generate a token and transmit the token to the user device. The token may be any randomly generated alphanumerical value and may be unique to each user or each account. The token's possession (e.g., when a software system has access to the token) may be concluded as authorization to access each user's profile. For example, if a computer can present the token to the external web server, the computer is deemed to be authorized. In some configurations, the computer server may retrieve the token from the user device and transmit the token to the external web server in order to establish itself as an authorized server to access the user's account.

In a next step 403, the computer system may receive user profile information from the external web server. The profile information received from the external web server may include basic information to create an incomplete profile with the external web service hosted by the external web server and may not include other information needed to generate a complete user profile. For example, if the external web service is an online merchant, the basic information may include the name and address of the user and may not include the user's preferences. In order to create a complete user profile with the external web service, the computer system may retrieve user profile data stored in the database and determine whether the user profile data includes the additional user information required to complete the user profile at the external web service. If the computer system determines that the user profile data is sufficient to update the user profile at the external web service and additional information is not needed, the computer system may transmit the retrieved user profile data to the external web server hosting the external web service. If the computer system determines that that the retrieved user profile data does not include user information to update the user profile at the external web service, the computer system may execute a next step 404.

In the next step 404, the computer system may transmit a request to a user device for additional user profile information. The computer system may transmit the request based upon the user profile information received by the computer system from the external server and the stored user profile information retrieved by the computer system from the database. For instance, the computer system may generate the request for user information that is required by the external service to create a full profile but is missing in the user profile stored in the database. As described above, in some configurations, the computer system may populate and render one or more containers displayed on the user device.

In a next step 405, the computer system may receive additional profile information from the user device and update the user profile in the database with the additional profile information. For example, the computer system may update the user profile in the user database with the additional profile information.

In a next step 406, the computer system may update the user profile in the external web service based upon the additional profile information. For example, the computer system may transmit the additional profile information to the external server with a request to update the user profile. For example, the computer system may transmit an instruction to external server that include the additional user data (e.g., user's information) and is configured to instruct the external server to input the additional user data.

Figure 5:
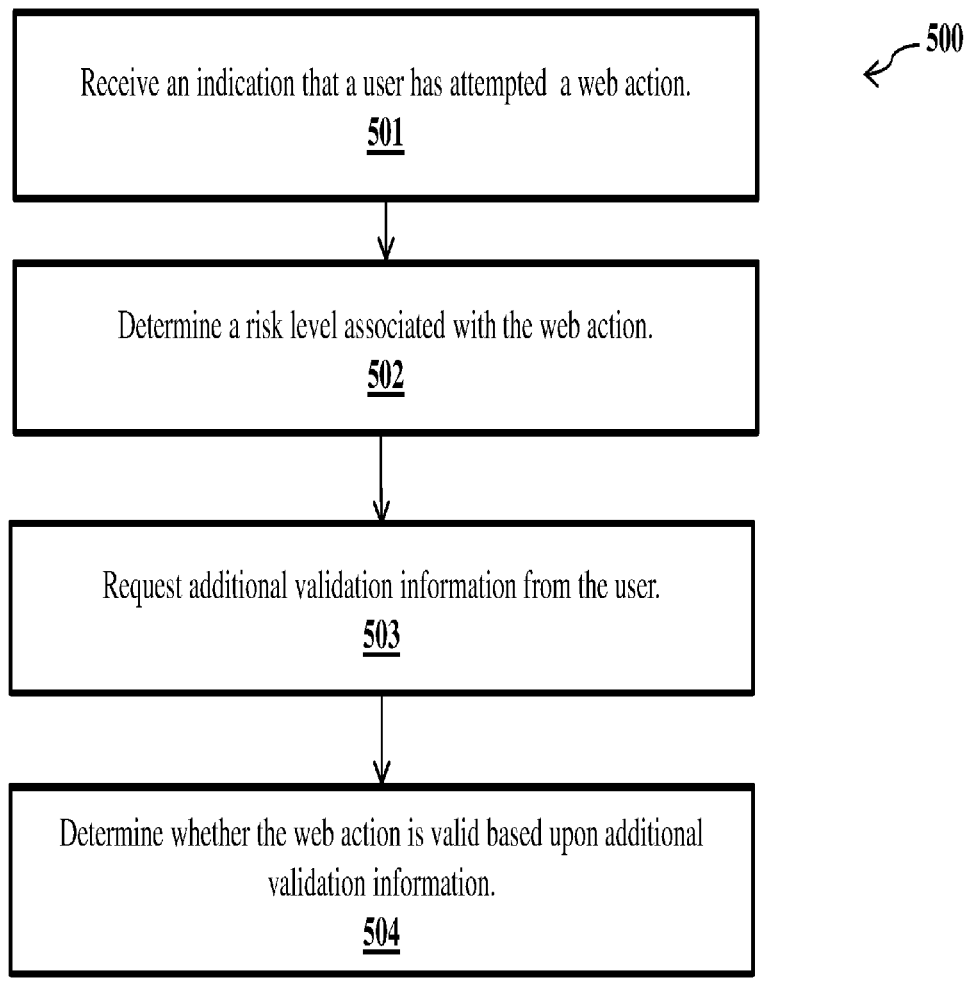
FIG. 5 shows an exemplary method of user device tracking and user behavior monitoring, according to an exemplary embodiment.

FIG. 5 shows an exemplary method 500 of user device tracking and user behavior monitoring, according to an exemplary embodiment. Although one or more computer systems and one or more databases may implement one or more steps of the method 500, the following description details, for brevity, a computer system and a database implementing the method 500.

In a first step 501, the computer system may receive an indication that a user has attempted a web action. The web action may include, for example, the user trying to log into an external web service hosted by an external web server. As another example, the web action may include the user trying to purchase merchandise from an online merchant. In some instances, the computer system may receive the indication from the user's device such as the user's smartphone, tablet, or computer. In other instances, the computer system may receive the indication from the web server hosting the external web service the user is attempting to access. In some examples, as described above, the computer server may utilize an application running in the background of the user's mobile device (or executing transparently on the user's computer device) to monitor the user's activities.

The computer system may receive identifying information of the user's device and information about the network the user's device is connected to. For example, the user may be using his mobile device inside a café to access his social media account. In this scenario, the computer system may receive the internet protocol (IP) address and/or the machine access code (MAC) address of the smartphone. Furthermore, the computer system may also receive the information about the network the smartphone is connected to, for example, the IP addresses of the various routers between the smartphone and the external web server hosting the social media web service. The computer system may also locate the smartphone based on the IP address of the device and the various routers. In addition, if the smartphone device has a global positioning service (GPS) system, the computer system may also receive the GPS information from the smartphone such that the computer system may geo-locate the smartphone.

In a next step 502, the computer system may determine a risk level associated with the web action. To do so, the computer system may retrieve the user profile in the database based on the identifying information received from the user's device. The user profile may include data records of the user's interaction with one or more external web services. The computer system may also retrieve from the database profiles of one or more external web services. The profiles of one or more external web services may include data records of the user's and other users' interaction with the one or more external web services. Based on the data records of the user profile, the computer system may determine the normal behavioral patterns of the user. In addition or in the alternative, the user profile may include data records indicating the normal behavioral patterns of the user. Furthermore, the computer system may determine the normal behavioral patterns of the user based upon the profiles of the one or more external web services. For instance, the computer system may determine behavioral patterns of other users to generate a generalized normal behavioral pattern of multiple users of the one or more external web services.

Based upon the normal behavioral patterns of the user, the computer system may determine the risk level associated with the web action. The risk level may include a low risk level, corresponding to normal behavior or a high risk, corresponding to the abnormal or fraudulent behavior. Continuing with the above example of a user attempting to log into his social media account from his smartphone, the computer system may compare the location of the smartphone with the various locations of the user in the user profile. For example, if the computer system determines that the user's current location has been visited by the user a number of times in the immediate past, the computer system may determine that the smartphone attempting to access the web service carries a low risk. However, if the computer system determines that the user's current location hasn't been visited at all by the user, the computer system may determine that the attempt to login to the social media account carries a high level of risk. If the computer system determines that the user's attempt of the web action is associated with a low risk, the computer may transmit an indication to the external web server that the user's attempted web action should be allowed. However, if the computer system determines that the user's attempt of the web action is associated with a high risk, the computer system may execute a next step 503.

In the next step 503, the computer system may request additional validation information from the user based upon the computer system determining that the attempted web action carries a high risk. In some instances, the computer system may transmit a message to the user device requesting the additional validation information. In other instances, the computer system may transmit a message to the external web server hosting the external web service indicating the external web server to send a message to the user device requesting the additional validation information. The additional validation information may include, for example, one or more security questions such that the computer system or the external web service may authenticate the user. In some other embodiments, the computer system may use this additional validation as a multi-channel validation method. For example, upon receiving an indication that the user is conducting a web action that is associated with a high risk on a computer operated by the user, the computer system may cause an application executing on the user's mobile device to request for the additional validating information. In this way, the computer system can use multi-channel validation methods by requiring the user to validate his web action using a different electronic device than the one used to conduct the web action.

In a next step 504, the computer system may determine whether the web action is valid based upon the additional validation information. The computer system may receive the additional validation information from the user's device. Based upon the validation information, the computer system may determine that the web action is valid. For example, the computer system may determine that the security questions transmitted by the computer system were correctly answered from the user's device. In the alternate, the computer system may determine that the attempted web action is invalid. The computer system may determine that the security questions transmitted by the computer system were incorrectly answered and thereby determine that the attempted web action is invalid despite the additional authentication step.

If the computer system determines that the user's web action is valid based upon the additional validation information, the computer system may transmit a message to the external web server that the user action is valid and therefore should be allowed. If the computer system determines that the user's web action is invalid based on the additional validation information, the computer system may transmit a message to the external web server that the user's web action is invalid and therefore should not be allowed. In addition, the computer system may transmit a fraud alert to a fraud alert team or system. Furthermore, the computer system may update the database with the record of an attempted fraud from the user device.

Figure 6:
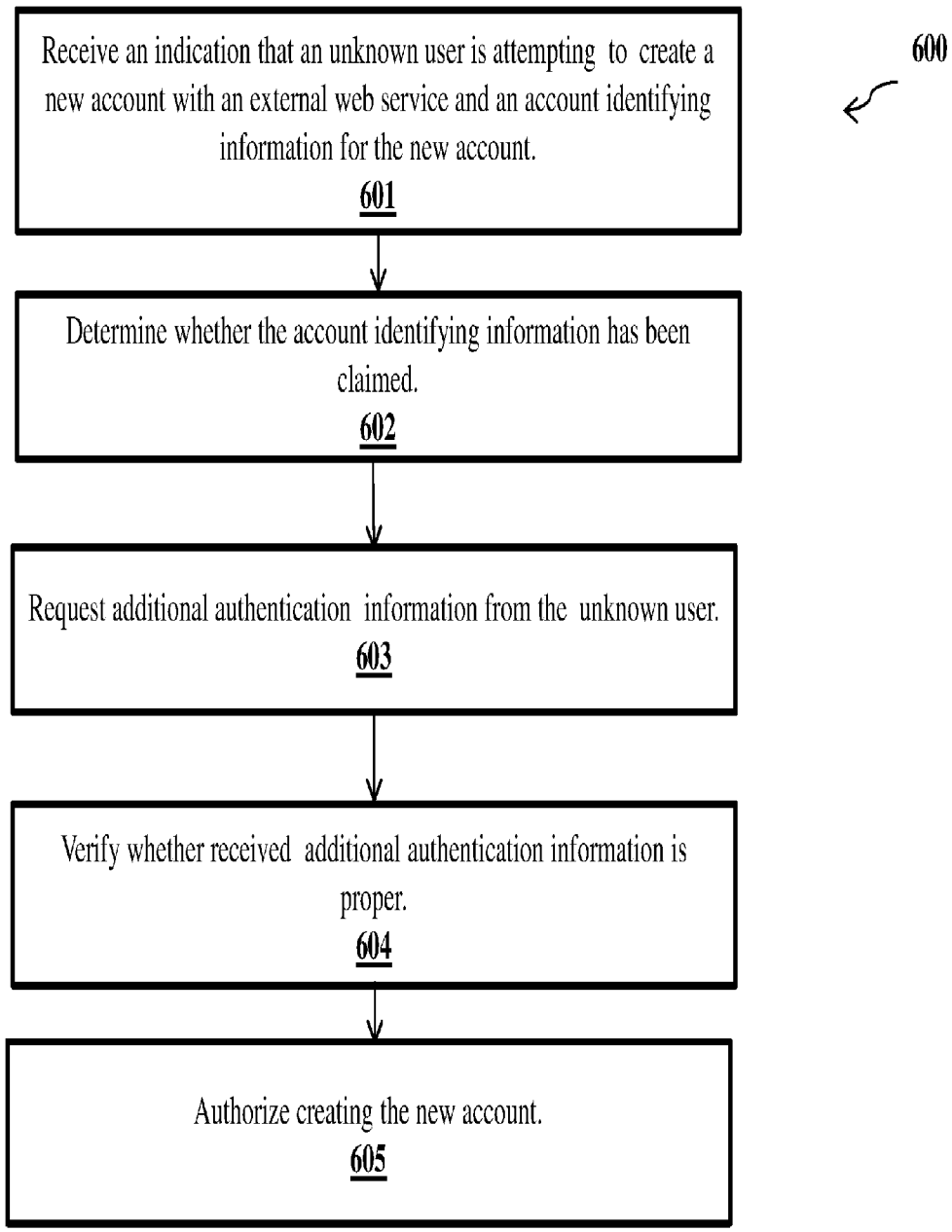
FIG. 6 shows an exemplary method of creating an account with an external web service for claimed online credentials, according to an exemplary embodiment.

FIG. 6 shows an exemplary method 600 of creating an account with an external web service for claimed online credentials, according to an exemplary embodiment. Although one or more computer systems and one or more databases may implement one or more steps of the method 600, the following description details, for brevity, a computer system and a database implementing the method 600.

In a first step 601, the computer system may receive an indication that an unknown user is attempting to create a new account with an external web service and an account identifying information for the new account. The computer system may receive the indication and the account identifying information from an external web server hosting the external web service. The account identifying information may include, for example, a username, an e-mail, or a social media handle used by the user when attempting to create the new account.

In a next step 602, the computer system may determine whether the account identifying information has been claimed. For instance, the computer system may query the database for the received account identifying information if data records with the account identifying information exist in the database. If the computer system determines that the account identifying information has not been claimed, the computer system may transmit a message to the external web server that the unknown user should be allowed to create an account with the external web service. If the computer system determines that the account identifying information has been claimed, the computer system may execute a next step 603.

In the next step 603, the computer system may request additional authentication information from the unknown user. For example, the computer system may transmit security questions to the unknown user's device. As another example, the computer system may request other verification information such as the unknown user's date of birth, address, or place of work.

In a next step 604, the computer system may verify whether received additional authentication information is proper. The computer system may query the database to determine whether the additional authentication information matches the corresponding data records in the database. If the computer system determines that the received additional authentication information is improper, the computer system may transmit a message to the external web server indicating that the attempted account creation should be denied by the external web service. The computer system may also transmit an alert to fraud detection computer systems that a fraudulent attempt is being made by the unknown user to create an unauthorized account. If the computer system determines that received additional authentication information is proper, the computer system may execute a next step 605.

In the next step 605, the computer system may authorize creating the new account. For example, the computer system may transmit a message to the external web server indicating that the attempted account creation should be allowed. Furthermore, the computer system may store the received account identifying information and the details of the new account in the database.

In operation, the computing system may receive a notification (from a webserver) that an unknown user is attempting to create a new user account. The computing system may then determine whether the unknown user's proposed user information has been claimed. For example, the computing system may query an internal database and determine if the unknown user's username matches an existing username. If the unknown user's information matches an existing user's information, the computing system may instruct the webserver to display an authentication prompt on the unknown user's electronic device. Upon the unknown user inputting various authentication data in response to the authentication prompt, the computing system may verify the authentication data; the computing system may then authorize the unknown user to create a new user account. For example, the computing system may instruct the webserver to create the user account using the data inputted by the unknown user.

Figure 7:
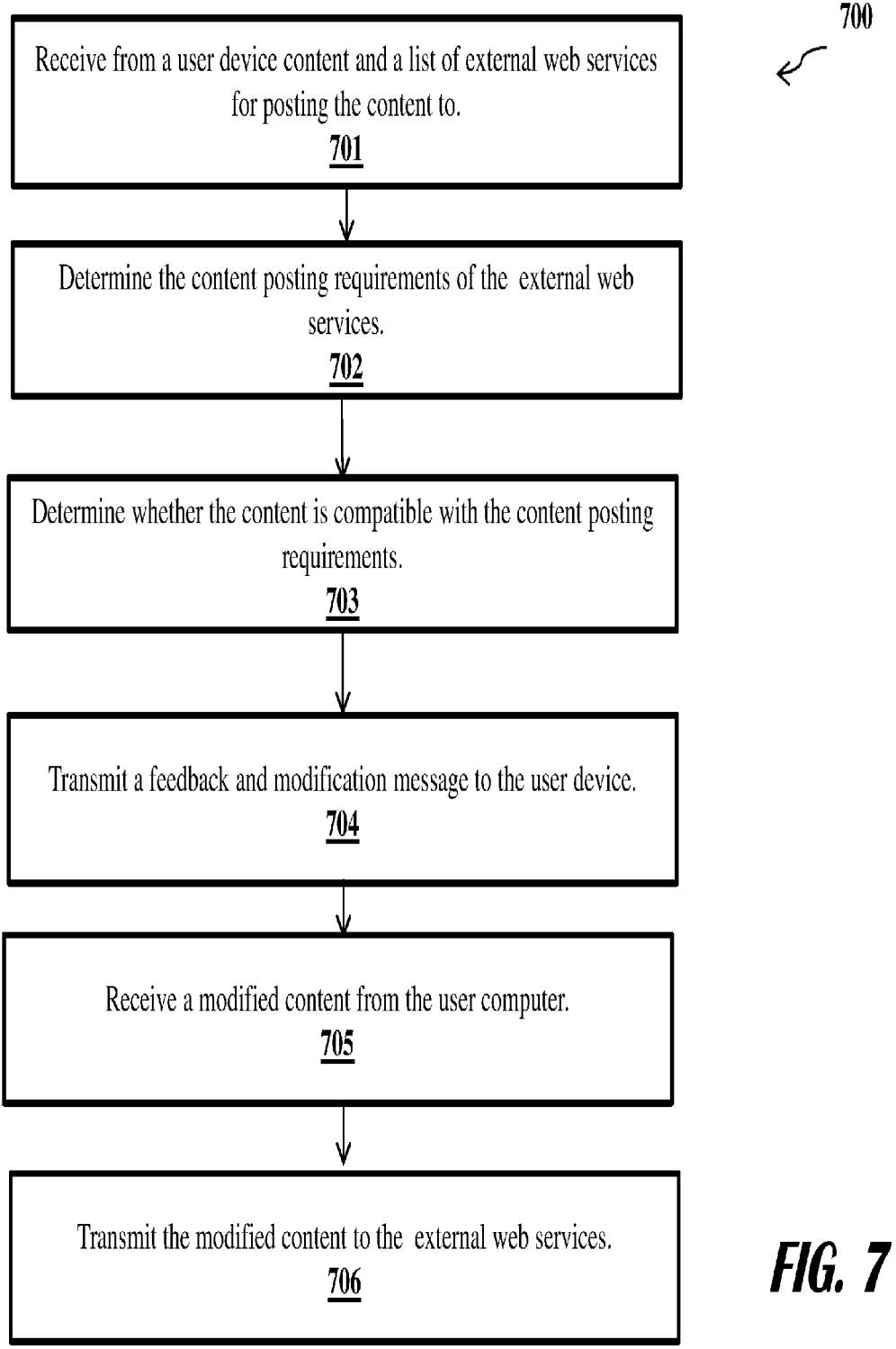
FIG. 7 shows an exemplary method of aggregating and organizing user contents, according to an exemplary embodiment.

FIG. 7 shows an exemplary method 700 of aggregating and organizing user contents, according to an exemplary embodiment. Although one or more computer systems and one or more databases may implement one or more steps of the method 700, the following description details, for brevity, a computer system and a database implementing the method 700.

In a first step 701, the computer system may receive, from a user device, content and list of external web services for posting the content to. The content may include, for example, social media posts, blog posts, comments, or any other type of content. The content format may include text, picture, photographs, multimedia files, or any other content format. The list of external web services may include, for example, social media websites, blog websites, news sites, or any other type of external web services. In some configurations, the computer system may receive the content via an application transparently executing on the user device. For example, the computer system may monitor the user's activities via an application running in the background of the user's mobile device. For example, when a user initiates a social media application and inputs digital content to be posted on the social media website, the computer system causes the application to be displayed on the foreground and (as described below) displays various prompts to receive digital content to be posted on one or more social media websites.

In a next step 702, the computer system may determine the content posting requirements of the external web services. In some instances, the computer system may transmit messages requesting the content posting requirements to the external web servers hosting the corresponding external web services. In addition or in the alternative, the computer system may retrieve from the database the data records of the profiles of the external web services and determine the content posting requirements based upon the profiles of the corresponding external web services.

In a next step 703, the computer system may determine whether the content is compatible with the content posting requirements. For example, a social media website may have a length restriction for a post. As another example, a blog may have a minimum word length and a maximum word length. Furthermore, a text based content provider may not allow multimedia content. Based on content posting requirements, the computer system may determine whether the content or the portion thereof is compatible with the content posting requirement of the web services. The computer system may further generate an indication as to the required modification of the content or a portion thereof. For example, if the length of the content is higher than the maximum length allowed by the content publishing web service, the computer system may generate an indication to the user that the content is too long and has to be shortened to meet the requirements. In some configurations, a social media website may restrict certain undesirable images (e.g., inappropriate or adult-themed images, copyrighted images, and the like); the computer system may then utilize image recognition protocols to identify whether the content received from the user device complies with the content posting requirements. The computer system may also transmit the content to a third-party server (not shown herein) for content or image recognition. Additionally or alternatively, the social media website may also restrict certain words from being posted on the social media webserver.

In some embodiments, the computer system may also query an internal database and retrieve the user's content posting requirements. A user may have specific restrictions for content posted on different social media websites and these restrictions and requirements may be stored in a user profile (e.g., the user may use a GUI render by the computer system to indicate different requirements for different social media websites). In those embodiments, the computer system may receive the same content from the user device, modify according to different social media websites, and transmit two different modified social media content to be posted on different social media.

In a next step 704, the computer system may transmit a feedback and a modification message to the user device. The feedback may include, for example, an indication that the content is too long for an external web service, an indication that a picture to be posted does not meet the requirements of the external web service. The computer system may generate the modification message with recommended changes to the content. For example, the modification message may include recommendations to shorten the content or to remove special characters in the content that are not recognized by the content posting external web service. In some instances, the computer system may transmit a unique feedback and a modification message for each of the web services. In some instances, the computer system may transmit a substantially similar feedback and modification message for a group of web services.

In a next step 705, the computer system may receive a modified content from the user computer. In some instances, the computer system may receive the content with different modifications tailored to the corresponding external web services.

In a next step 706, the computer system may transmit the modified content to the web services. In other words, the computer system may transmit content with modifications to a web service according to the requirements of that external web service.

In operation, the computer system may display a prompt on a user device that allows the user to upload digital content to be electronically published on one or more social media websites. For example, the prompt may include one or more graphical user input elements (e.g., radio button, drop down menus, text input fields, media elements input fields, and the like). The user may use the above-mentioned graphical input field to input one or more media elements (e.g., pictures) and/or text strings. The user may also utilize the radio buttons to select one or more social media websites and may instruct the computer system to transfer the inputted content to the selected social media websites. In response to receiving the instruction from the user device (e.g., instruction to transmit the digital content to one or more social media websites), the computer system may then query the selected social media webservers to receive their posting requirements. For example, the computer system may query social media webserver ABC (e.g., hosting social media website ABC) and retrieve social media ABC's posting requirements. The computer system may also query a database and determine whether the user has any specific content requirements for the selected social media webservers. Subsequently, the computer system may determine whether the digital content received form the user device is in compliance with the retrieved guidelines and requirements (e.g., from the social media web servers and/or the user profile). The computer system may modify the content based on the social media posting requirements (e.g., delete restricted words), and display the modified message on the user device. Upon receiving approval form the user device, the computer system may then transmit the message to the selected social media webservers.

In a non-limiting example of the above-mentioned method 700, the computing system may receive, via the prompt displayed on the user device, an instruction to electronically publish digital content on two different social media websites. The digital content may include an image and a text string. The computing system may first identify a webserver associated with each social media website and query each webserver to retrieve their respective posting requirements. The computing device may then utilize an image recognition software (or transmit the image to a third party image recognition server) to determine whether the image contains any restricted content. The computing server may then determine whether the received text string complies with the social media requirements. The computing server may then compare the content of the image and the text string with a user profile for each social media website. If the digital content complies with the user profile requirements and the social media requirements of each identified social media webserver, the computing server may instruct the social media webservers to electronically publish the digital content. If the computing system determines that the digital content does not comply with any of the above-mentioned requirements, the computing system may notify the user device. The notification may include the reasons why the digital content does not comply with any of the requirements and may redirect the user to modify the digital content (e.g., rephrase the text string). Upon receiving modified digital content, the computing system may reevaluate the digital content.

Method 700 allows a user to post multiple social media content simultaneously and without the need to change different social media application, which creates a better user experience. For example, instead of initiating different social media application and inputting customized content, the user may only provide the content once and the computer system may modify the content and customize the content for each social media web site.

Figure 8:
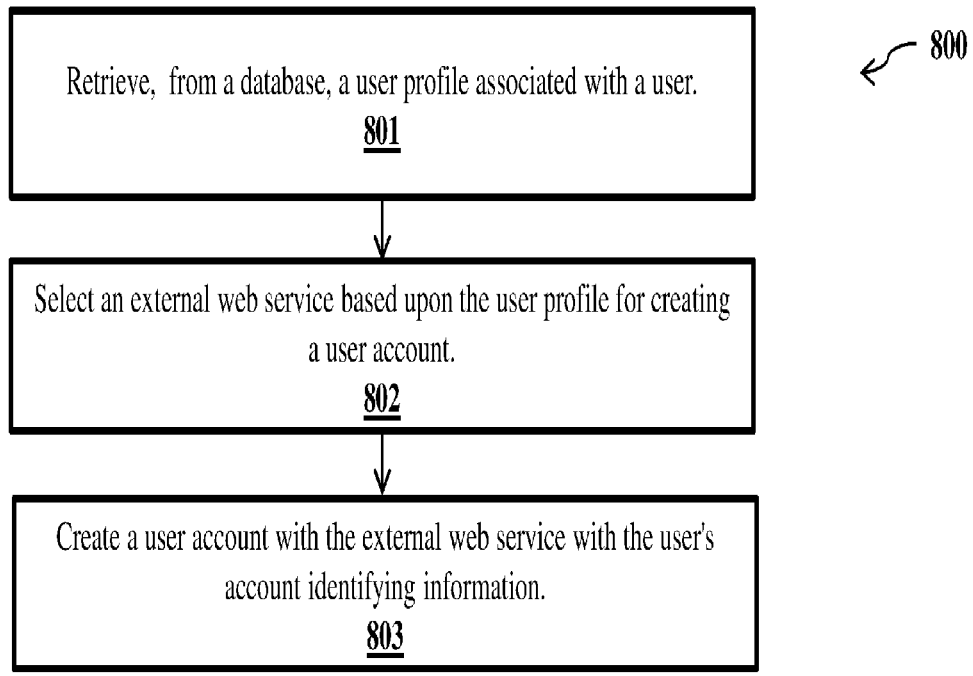
FIG. 8 shows an exemplary method of automatically creating new user accounts, according to an exemplary embodiment.

FIG. 8 shows an exemplary method 800 of automatically creating new user accounts, according to an exemplary embodiment. Although one or more computer systems and one or more databases may implement one or more steps of the method 800, the following description details, for brevity, a computer system and a database implementing the method 800.

In a first step 801, the computer system may retrieve from a database a user profile associated with a user. The user profile may include one more account identifying information such as usernames or social media handles. The user profile may further include one or more account security information such as passwords, passcodes, biometric data, or pin codes. The user profile may also include the preferences of a user. The preferences may be, for example, data records indicating that the user prefers accounts with social media websites as opposed to blog sites. The user profile may include data records indicating the usage pattern of a user. For example, a user may have created accounts with a number of social media websites but may not have created accounts with just a few online merchants. The usage pattern may also include the user's online traffic, for example, how much time the user spends on social media.

In a next step 802, the computer system may select an external web service based upon the user profile for creating a user account. For example, the computer system may determine that the external service is a new social media entity. Furthermore, the computer system may determine, based upon the user's usage patterns and preferences in the user profile that the user may want to create an account with the new social media entity.

In a next step 803, the computer system may create a user account with the external web service with the user's account identifying information. More specifically, the computer system may transmit the user's username or a social media handle to an external web server hosting the external web service to create an account the username or the social media handle. Furthermore, the computer system may transmit other information such as answers to authentication questions to create the user's account. In some implementations, the computer system may use the application programming interface (API) of a web-application running in the external web server to transmit information to the external web server. In other implementations, the computer system may initiate a browser session with the external web server, access a website hosted by the external web server, and transmit the information to the website.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:
receiving, via a processor, a request from a computing device associated with a user to perform an action via a web service;
receiving, via the processor, identifying information associated with the computing device;
retrieving, via the processor, a user profile based on the identifying information associated with the computing device, wherein the user profile comprises one or more data records corresponding to one or more interactions by the user with the web service, wherein the one or more data records comprise one or more locations of the computing device when the user is performing the action via the web service;
determining, via the processor, an expected behavioral pattern of the user based on the one or more data records, wherein the expected behavioral pattern comprises an expected location of the user;
determining, via the processor, a risk level associated with the request based on the identifying information, the expected behavioral pattern, and the action;
sending, via the processor, an additional request for validation information to the computing device in response to the risk level being above a threshold;
receiving, via the processor, the validation information from the computing device; and
executing, via the processor, the action via the web service in response to determining that the validation information matches expected validation information.

2. The method of claim 1, wherein the action comprises logging into the web service, purchasing merchandise via the web service, or both.

3. The method of claim 1, wherein the identifying information comprises an internet protocol (IP) address, a machine access code (MAC) address, network information, global positioning system (GPS) information, or any combination thereof.

4. The method of claim 1, wherein the expected behavior pattern comprises a number of times that the computing device sends the request.

5. The method of claim 1, wherein the validation information corresponds to one or more answers to one or more security questions for authenticating the user.

6. The method of claim 1, comprising sending a fraud alert to the web service in response to determining that the validation information does not match the expected validation information.

7. The method of claim 1, comprising updating a database with a record of an attempted fraud in response to determining that the validation information does not match the expected validation information.

8. A non-transitory computer-readable medium comprising computer-executable instructions that, when executed by at least one processor, causes the at least one processor to perform operations comprising:
receiving a request from a computing device associated with a user to perform an action via a web service;
receiving identifying information associated with the computing device;
retrieving a user profile based on the identifying information associated with the computing device, wherein the user profile comprises one or more data records corresponding to one or more interactions by the user with the web service, wherein the one or more data records comprise one or more locations of the computing device when the user is performing the action via the web service;

determining an expected behavioral pattern of the user based on the one or more data records, wherein the expected behavioral pattern comprises an expected location of the user;

determining a risk level associated with the request based on the identifying information, the expected behavioral pattern, and the action;

sending an additional request for validation information to the computing device in response to the risk level being above a threshold;

receiving the validation information from the computing device; and executing the action via the web service in response to determining that the validation information matches expected validation information.

9. The non-transitory computer-readable medium of claim 8, wherein the action comprises logging into the web service, purchasing merchandise via the web service, or both.

10. The non-transitory computer-readable medium of claim 8, wherein the identifying information comprises an internet protocol (IP) address, a machine access code (MAC) address, network information, global positioning system (GPS) information, or any combination thereof.

11. The non-transitory computer-readable medium of claim 8, wherein the expected behavior pattern comprises a number of times that the computing device sends the request.

12. The non-transitory computer-readable medium of claim 8, wherein the validation information corresponds to one or more answers to one or more security questions for authenticating the user.

13. The non-transitory computer-readable medium of claim 8, wherein the computer-executable instructions cause the at least one processor to perform the operations further comprising sending a fraud alert to the web service in response to determining that the validation information does not match the expected validation information.

14. The non-transitory computer-readable medium of claim 8, wherein the computer-executable instructions cause the at least one processor to perform the operations further comprising updating a database with a record of an attempted fraud in response to determining that the validation information does not match the expected validation information.

15. A system, comprising:
a first computing device associated with a user; and
a second computing device configured to:
receive a request from the first computing device associated with the user to perform an action via a web service;

receive identifying information associated with the first computing device;

retrieve a user profile based on the identifying information associated with the first computing device, wherein the user profile comprises one or more data records corresponding to one or more interactions by the user with the web service, wherein the one or more data records comprise one or more locations of the first computing device when the user is performing the action via the web service;

determine an expected behavioral pattern of the user based on the one or more data records, wherein the expected behavioral pattern comprises an expected location of the user;

determine a risk level associated with the request based on the identifying information, the expected behavioral pattern, and the action;

send an additional request for validation information to the first computing device in response to the risk level being above a threshold;

receive the validation information from the first computing device; and execute the action via the web service in response to determining that the validation information matches expected validation information.

16. The system of claim 15, wherein the action comprises logging into the web service, purchasing merchandise via the web service, or both.

17. The system of claim 15, wherein the identifying information comprises an internet protocol (IP) address, a machine access code (MAC) address, network information, global positioning system (GPS) information, or any combination thereof.

18. The system of claim 15, wherein the expected behavior pattern comprises a number of times that the first computing device sends the request.

19. The system of claim 15, wherein the validation information corresponds to one or more answers to one or more security questions for authenticating the user.

20. The system of claim 15, wherein the second computing device is configured to send a fraud alert to the web service in response to determining that the validation information does not match the expected validation information.

* * * * *